Dec. 23, 1958 R. W. WOLLENTIN 2,865,863
LEAD-AND MANGANESE-ACTIVATED CADMIUM
FLUOROPHOSPHATE PHOSPHOR
Filed Jan. 24, 1955 3 Sheets-Sheet 1
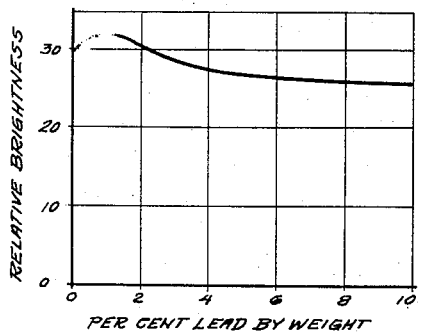
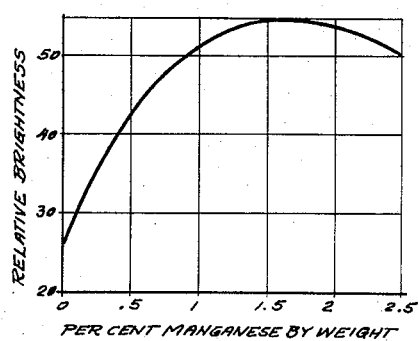
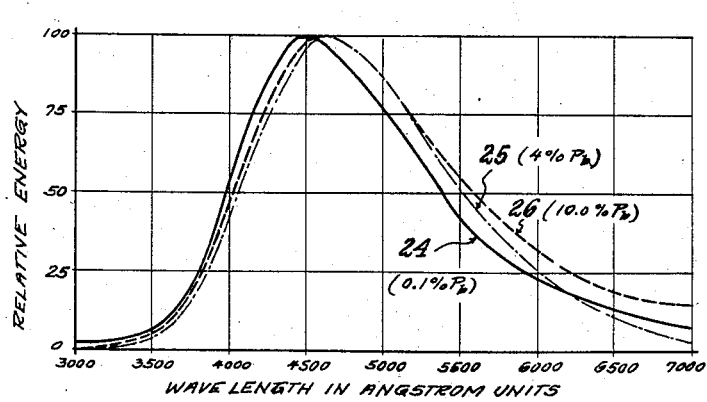
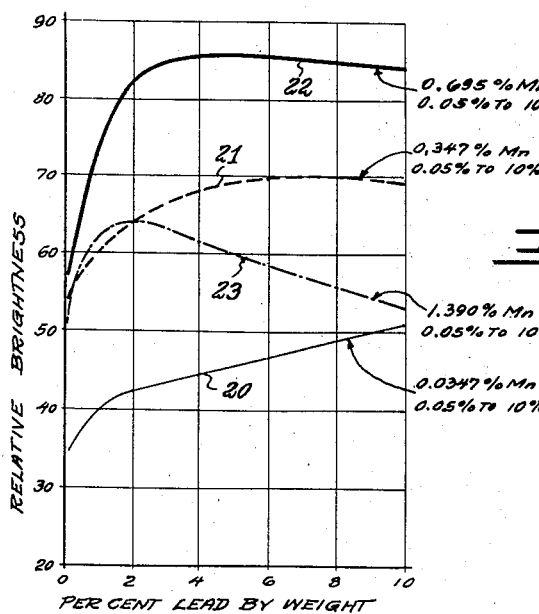
INVENTOR.
R. W. WOLLENTIN.
BY
ATTORNEY.

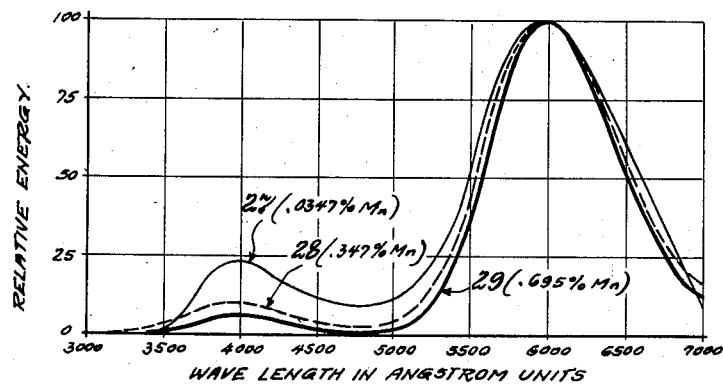
Fig. 5.
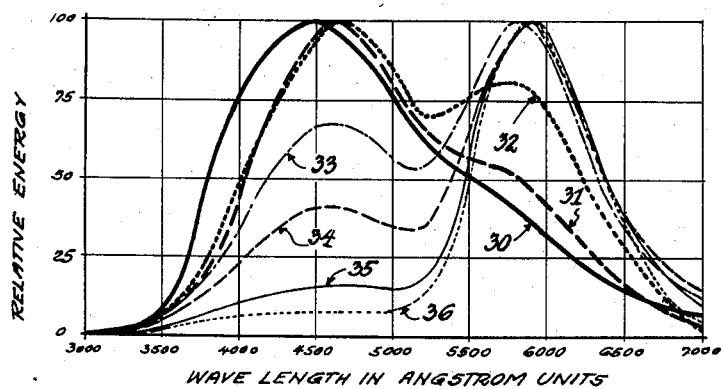
Fig. 6.
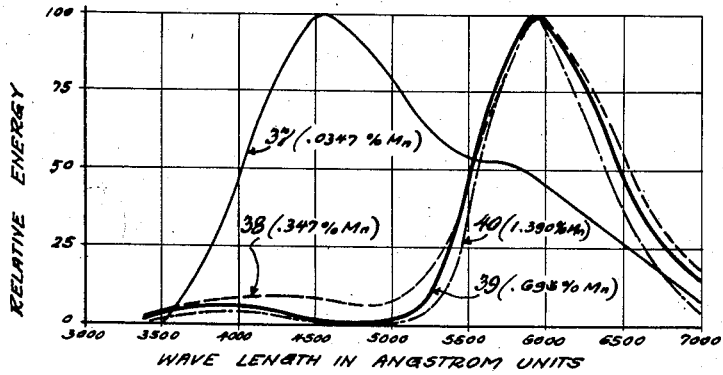
Fig. 7.
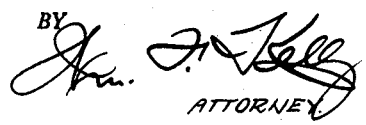

INVENTOR.
R. W. WOLLENTIN
BY
ATTORNEY.

United States Patent Office 2,865,863
Patented Dec. 23, 1958

2,865,863

LEAD- AND MANGANESE-ACTIVATED CADMIUM FLUOROPHOSPHATE PHOSPHOR

Robert W. Wollentin, Bloomfield, N. J., assignor to Westinghouse Electric Corporation, East Pittsburgh, Pa., a corporation of Pennsylvania Application January 24, 1955, Serial No. 483,773

4 Claims. (Cl. 252—301.6)

This invention relates to luminescent materials and, more particularly, to a luminescent material having a spectral distribution which is peaked at about 5900 A. U. for use in gas-discharge lamps.

Heretofore, lead-activated cadmium fluorophosphate phosphors have been known wherein the molar ratio of cadmium orthophosphate to cadmium fluoride is 3 to 1. Where such a phosphor is activated by both lead and manganese, however, the duration and intensity of the phosphorescence are normally decreased thereby rendering the phosphor unsuitable for use in gas-discharge lamps. It was therefore unexpected that where the molar ratio of cadmium orthophosphate to cadmium fluoride is from 3:1.5 to 3:4.5 and the phosphor is activated by limited amounts of both lead and manganese, that the fluorescent brightness or intensity would be increased under 2537 A. U. excitation.

It is the general object of this invention to provide a lead- and manganese-activated cadmium fluorophosphate luminescent material having a strong peak radiation at about 5900 A. U. when irradiated by 2537 A. U.

It is a further object to provide permissible raw-mix components and proportions thereof which may be fired to produce lead- and manganese-activated cadmium fluorophosphate luminescent material.

It is another object to provide a method for making a lead- and manganese-activated cadmium fluorophosphate luminescent material.

The aforesaid objects of the invention, and other objects which will become apparent as the description proceeds, are achieved by providing a lead- and manganese-activated cadmium fluorophosphate phosphor where the molar ratio of cadmium orthophosphate to cadmium fluoride is from 3:1.5 to 3:4.5 and the lead and manganese activators are maintained within allowable limits. Where activator percentages are hereinafter referred to, the percent by weight of the activator with respect to the cadmium orthophosphate in the phosphor is intended.

For a better understanding of the invention, reference should be had of the accompanying drawings where Fig. 1 is a graph of relative brightness vs. percent lead by weight for lead-activated cadmium fluorophosphate.

Fig. 2 is a graph representing relative brightness vs. percent manganese by weight for manganese-activated cadmium fluorophosphate.

Fig. 3 is a graph representing relative brightness vs. percent lead and manganese by weight for lead- and manganese-activated cadmium fluorophosphate.

Fig. 4 shows a spectral distribution curve of relative energy vs. wave length for lead-activated cadmium fluorophosphate when irradiated with 2537 A. U.

Fig. 5 illustrates a spectral distribution curve of relative energy vs. wave length for manganese-activated cadmium fluorophosphate when irradiated with 2537 A. U.

Fig. 6 illustrates spectral distribution curves of relative emission vs. wave length for lead- and manganese-activated cadmium fluorophosphate.

Fig. 7 represents spectral distribution curves of relative energy vs. wave length for a lead- and manganese-activated cadmium fluorophosphate where the lead activator is present in relatively small amounts.

Figure 8:
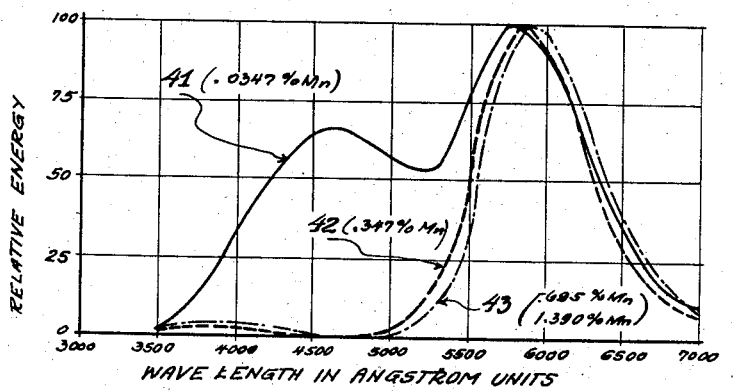
Fig. 8 shows spectral distribution curves for lead- and manganese-activated cadmium fluorophosphate where the lead activator is present in larger amounts.

With specific reference to the performance characteristics of the luminescent material of this invention, there is illustrated in Fig. 1 a graph representing relative brightness vs. percent lead activator by weight for lead-activated cadmium fluorophosphate luminescent material. Such a phosphor has as its essential elements cadmium, phosphorus, fluorine, oxygen and lead and has the general formulation $3Cd_3(PO_4)_2 \cdot 2.5CdF_2$:Pb. The relative brightness measurements for this phosphor, and all relative brightness measurements hereinafter referred to, were made with a Weston type 3 "Photronic Cell," equipped with an eye-sensitivity filter so that the photocell sensitivity was substantially the same as the sensitivity of the eye. Any other photocell with a corresponding "eye sensitivity" could be used in measuring the relative brightness, which is indicated in arbitrary units with all data in all curves taken under the same conditions. As indicated in Fig. 1, the relative brightness, which is indicated in arbitrary units for purposes of comparison, registers a peak of 32 at about 0.7% lead activator and thereafter slowly decreases to about 25.5 at 10% lead activator.

In Fig. 2, is illustrated a graph representing the relative brightness vs. percent manganese activator by weight for manganese-activated cadmium fluorophosphate luminescent material. Such a phosphor has as its essential elements, cadmium, phosphorus, fluorine, oxygen and manganese and has the general formulation $$3Cd_3(PO_4)_2 \cdot 2.5CdF_2 : Mn$$

As illustrated, the relative brightness is quite low for small manganese activator concentrations, registers a peak of about 55 arbitrary units at about 1.6% manganese activator and thereafter decreases to about 50 arbitrary brightness units at 2.5% manganese activator.

In Fig. 3 there is illustrated a graph of relative brightness vs. percent activator by weight for a cadmium fluorophosphate luminescent material activated by both lead and manganese. Such a phosphor has as its essential elements cadmium, phosphorus, fluorine, oxygen, lead and manganese and the preferred embodiment has the general formulation $3Cd_3(PO_4)_2 \cdot 2.5CdF_2$:Mn:Pb with an excess of $P_2O_5$. The fluoride may vary within allowable limits with respect to the cadmium orthophosphate and the activator may vary within allowable limits with respect to the cadmium orthophosphate, as is hereinafter explained. Curve 20, as illustrated in Fig. 3, represents the manganese activator in the foregoing phosphor maintained at 0.034% while the lead activator is varied from 0.05% to 10%. Curve 21 in Fig. 3 represents the manganese activator maintained at 0.34% while the lead activator is varied from 0.05% to 10%. Curve 22 represents the manganese activator maintained at 0.695% while the lead activator is varied from 0.05 to 10%. Curve 23 represents the manganese activator maintained at 1.390% while the lead activator is varied from 0.05% to 10%. As illustrated, the optimum amount of manganese is about 0.695% although the manganese may vary from 0.0347% to 1.390% and the phosphor will still be generally satisfactory for some applications. It is desirable, however, to maintain the manganese activator from 0.347% to 1.041%.

There should preferably be at least 1% by weight of cadmium phosphate of lead activator present in order to insure that a usable percentage of the phosphor spectral emission is peaked within that portion of the visible spectrum where the eye is relatively sensitive, or at about 5900 A. U. in this case, as will be hereinafter explained. With the optimum amounts of manganese utilized, a percentage of lead activator slightly over 10% will produce a satisfactory phosphor brightness, as illustrated in curve 22 of Fig. 3, but with over 10% of lead present as an activator, the phosphor when fired tends to sinter excessively and it is very difficult to reduce to a finely-divided phosphor powder, which is desired for the best performance in fluorescent lamps or other gas-discharge lamp applications. In addition, where lead activator is present in amounts exceeding 10% the phosphor color changes from white to gray. Since it is highly desirable to keep the phosphor as white as possible in order to allow maximum transmission of emitted light for highest lamp efficiency, the lead percent by weight of cadmium orthophosphate should not exceed 10.

In Fig. 4 are represented spectral distribution curves for the heretofore mentioned lead-activated cadmium fluorophosphate luminescent material. Curve 24 represents the spectral distribution of the phosphor where the lead activator concentration is 0.1% and, as illustrated, the emission is peaked at about 4500 A. U. Curve 25 represents the spectral distribution of this phosphor where the lead activator concentration is 4% and curve 26 represents the spectral distribution for this phosphor where the lead activator concentration is 10%. In the latter two curves the spectral distribution is peaked at about 4650 A. U.

In these spectral distribution curves, and in all spectral distribution curves referred to herein, each individual curve is represented as an entity, with the most intense increment of observed value of radiation arbitrarily set at a relative value of 100, and the remaining measured increments of the spectral distribution for each individual curve correlated to this value of 100 and plotted accordingly. Thus, each of the spectral distribution curves represents only the radiation spectral distribution for the specific individual phosphor formulation represented by the individual curve. Accordingly, although the three individual curves represented in Fig. 4 are each indicated as having a peak value of 100, this does not necessarily indicate that the maximum radiation intensity for each is the same. This practice in representing the spectral distribution of a luminescent material is customary in the art.

In Fig. 5 are representative spectral distribution curves for the heretofore-mentioned manganese-activated cadmium fluorophosphate and these curves illustrate the effect of varying the manganese activator concentration in the luminescent material. Curve 27 repesents a manganese activator concentration of 0.0347% and the emission is peaked at about 6000 A. U. with a small secondary peak at about 4000 A. U. Curve 28 represents a manganese concentration of 0.347% and the emission is peaked at about 6000 A. U. Curve 29 represents a manganese activator concentration of 0.695% and, as illustrated, the emission is peaked at about 6000 A. U. In the two latter curves any secondary peaks at shorter wave length are negligible.

In Fig. 6 are illustrated spectral distribution curves for the lead- and manganese-activated cadmium fluorophosphate luminescent material of this invention.

In all of these curves the manganese concentration is maintained at 0.347% and the lead concentration is varied from 0.5% to 10%. A summary of the curves shown in Fig. 6 is given in the following table:

| Curve | Percent Pb | Emission Peak, A. U. | Secondary Peak |
|---|---|---|---|
| 30 | 0.5 | 4,500 | none |
| 31 | 1.0 | 4,600 | none |
| 32 | 2 | 4,600 | 5,800 |
| 33 | 4 | 5,830 | 4,600 |
| 34 | 6 | 5,830 | 4,600 |
| 35 | 8 | 5,900 | none |
| 36 | 10 | 5,900 | none |

An analysis of these curves shows that from 1% and 10% of lead is required to provide a useable percentage of the spectral distribution within the eye-sensitive portion of the spectrum, which eye-sensitive portion is peaked at about 5600 A. U., and to insure that the phosphor brightness is satisfactory. However, it is preferable to use from 3% and 8% of lead activator to insure a strong peak at about 5900 A. U. and yet use a minimum of lead to insure against hardness of the phosphor and to insure that the phosphor color is as white as possible.

In Fig. 7 are represented curves which illustrate the effect of varying the manganese activator concentration for the lead- and manganese-activated luminescent material of this invention, while the lead activator concentration is maintained at 0.1%. With a manganese activator concentration of 0.0347% there is experienced a spectral distribution which is peaked at about 4600 A. U. with a small secondary peak at about 5800 A. U., as illustrated in curve 37. With a manganese activator concentration of 0.347% there is experienced a single emission peak at about 5900 A. U., as illustrated in curve 38. With a manganese activator concentration of 0.695% as illustrated in curve 39, the spectral emission is substantially similar to that experienced at the lower manganese activator concentration of 0.347%. As illustrated in curve 40 (1.390% Mn) a further increase of manganese activator concentration has little effect on further changing the spectral distribution.

In Fig. 8 are represented curves which illustrate the effect of varying the manganese activator concentrations for the luminescent material of this invention where the lead activator concentration is maintained at 4%. Curve 41 represents a manganese activator concentration of 0.0347% which produces an emission peak at about 5800 A. U. and a small secondary peak at about 4600 A. U. Curve 42 represents a manganese activator concentration of 0.347% and a single emission peak is experienced at about 5860 A. U. Curve 43 represents manganese concentrations of 0.695% and 1.390% and a single emission peak is experienced at about 5900 A. U.

Figure 9:
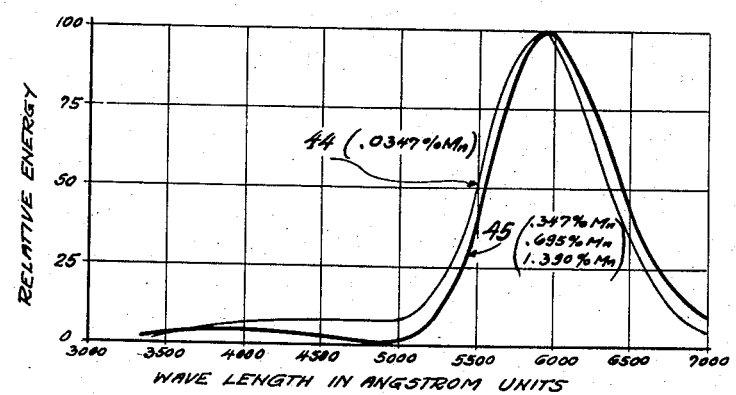
Fig. 9 represents spectral distribution curves of relative energy vs. wave length for lead- and manganese-activated cadmium fluorophosphate where lead activator is present in relatively large amounts.

In Fig. 9 are represented spectral distributions for the lead- and manganese-activated luminescent material of this invention where the manganese activator concentration is varied and the lead concentration is maintained at 10%. Curve 44 represents a manganese concentration of 0.0347% and a single emission peak is experienced at about 5900 A. U. Curve 45 represents a manganese concentration varying from 0.347% to 1.390% and a single emission peak is experienced at about 5910 A. U.

Considering together the curves represented in Figs. 7, 8 and 9 and the curves represented in Figs. 4 and 5, it will be seen that the effect of increasing the lead concentration produces very unusual results from what might be expected. The lead-activated cadmium fluorophosphate phosphor displays a single emission peak at about 4600 and the manganese-activated cadmium fluorophosphate has a strong emission peak at about 6000. Where the luminescent material is activated by both lead and manganese, and both the manganese concentration and lead concentration are very small, e. g. 0.0347% and 0.1% respectively, the lead activator seemingly dominates the luminescent material causing a spectral distribution peak at about 4600, e. g., see curve 37 in Fig. 7. However, where the lead concentration is increased, but the manganese concentration is maintained at this relatively low value of 0.0347%, the emission peak shifts to the right to about 5800 A. U. and only a small emission peak is experienced at about 4600 A. U., e. g. see curve 41 in Fig. 8. Where the lead concentration is further increased while the manganese concentration is maintained at a relatively low value, the luminescent material has but a single emission peak at about 5900 A. U., e. g. see curve 44 in Fig. 9. One would expect additional lead activator concentrations to shift the emission peak to the left rather than to the right, as is actually experienced. No explanation of the foregoing completely unexpected result is offered except that a completely new luminescent material is formed where the lead and manganese concentrations are maintained within the heretofore prescribed limitations.

Figure 10:
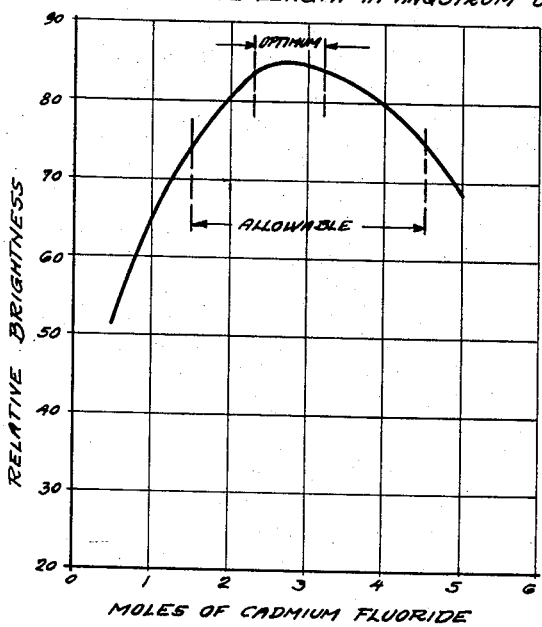
Fig. 10 is a graph representing relative brightness vs. moles of cadmium fluoride for lead- and manganese-activated cadmium fluorophosphate.

In Fig. 10 is represented a curve of relative brightness vs. moles of cadmium fluoride present in the preferred lead- and manganese-activated cadmium-fluorophosphate luminescent material of this invention. The optimum moles of cadmium fluoride per 3 moles of tertiary cadmium phosphate are from 2.5 to 3, at which ratio the phosphor has a relative brightness of about 85. The usable range of moles of cadmium fluoride per 3 moles of cadmium phosphate may vary within the relatively wide limits of 1.5 to 4.5. These usable or allowable molar limitations have been arrived at by purely arbitrary designation based upon the dictates of what constitutes a usable competitive phosphor and as illustrated, at the $CdF_2$ concentration extremes of 1.5 moles and 4.5 moles the relative brightness of the phosphor is still about 75.

In preparing the preferred embodiment of the luminescent material of this invention, the following raw-mix components may be mixed in amounts as given below. While molar quantities are indicated, these are only an indication of the ratios of the raw-mix components with respect to one another which should be used.

| Component | Example 1 (Preferred), Moles | Example 2, Moles |
| --- | --- | --- |
| CdO | 9 | 12 |
| $(NH_4)_2HPO_4$ | 7.5 | 7.5 |
| $CdF_2$[1] | 3 | 6.0 |
| $PbCO_3$ | 0.458 | .458 |
| MnO | 0.20 | 0.20 |

[1] Use $NH_4$ for $CdF_2$.

The above raw materials are thoroughly mixed by ball-milling or other conventional mixing techniques and, as an example, a mixing time of 30 minutes is generally satisfactory. The ballmilling may be followed by a 10 minute hammermilling period and another 20 minutes of ballmilling, if desired. The heretofore given mixing times are more a matter of choice for the individual preparing the phosphor and are not critical, but are only given as an example. The mixed and blended raw materials are then placed in covered silica trays and fired in an air atmosphere at between 600° C. to 900° C. for one or more hours, and as a specific example, the raw materials may be fired at 800° C. for 1 hour. It is sometimes beneficial to provide a second milling and firing cycle and the foregoing process may be repeated in order to insure a complete reaction of the raw materials, although the second cycle of milling and firing is not necessary.

Many different raw-mix materials may be substituted for the materials given in the foregoing examples and the resulting luminescent material will be the same. Broadly, the raw-mix materials may be broken down into 4 main categories. First, cadmium- and phosphorous- and oxygen-containing material which when fired will form $Cd_3(PO_4)_2$ with an excess of from 1 to 50 molar percent of $P_2O_5$ over the total moles of $Cd_3(PO_4)_2$ which would be formed if all of the cadmium were present as the orthophosphate. The optimum excess of $P_2O_5$ present in the raw mix is 25 molar percent. In other words, if there are 9 moles of CdO and 7.5 moles of $(NH_4)_2HPO_4$ in the raw mix and these components are suitably mixed and then fired, the resulting compound may be expressed as 3 moles of $Cd_3(PO_4)_2$ with an excess of 0.75 mole of $P_2O_5$. Actually this $P_2O_5$ must be chemically combined with the cadmium as metaphosphate, orthophosphate and various intermediate complexes. However, a chemical analysis will show so much CdO and so much $P_2O_5$, without showing how these oxides are combined. Thus a representation of so much $Cd_3(PO_4)_2$ with so much excess of $P_2O_5$ is accurate from an analytical standpoint and enables the compound to be identified accurately. Also, for the purposes of identifying the raw-mix components and the products formed on firing, it is immaterial for the purposes of this invention how these combine on firing, as long as the desired excess of phosphate is present. It is of course understood that the $Cd_3(PO_4)_2$ forming material should be free from non-volatile constituents other than the essential elements constituting the phosphor, namely cadmium, fluorine, phosphorus, oxygen, manganese and lead. Second, cadmium- and fluorine-containing material which when fired will form cadmium fluoride and which is free from non-volatile constituents other than the essential elements of the phosphor. Third, lead oxide or lead phosphate-forming material which is free from non-volatile constituents other than the essential elements of the phosphor. Fourth, manganese oxide or manganese phosphate-forming material which is free from non-volatile constituents other than the essential elements of the phosphor. When the aforementioned products of formation of the raw materials, e. g., MnO and $Pb_3(PO_4)_2$ are referred to, it is not meant that compounds such as MnO and $Pb_3(PO_4)_2$ exist as such in the final phosphor. All that is meant is that raw-mix materials which can form these products when fired individually in the manner prescribed for the phosphor will be satisfactory as raw-mix components for the luminescent material. Following are four tables in which are listed raw-mix components which may be used to form the phosphor. These tables are broken down as follows: Table I lists cadmium orthophosphate-forming materials which will produce the desired excess of $P_2O_5$. Table II lists cadmium fluoride-forming materials. Table III lists lead oxide and lead phosphate-forming materials. Table IV lists manganese oxide and manganese phosphate-forming materials. Any one of the individual compounds as given in Table I may be mixed with any one of the individual compounds as selected from each of the Tables II, III and IV in order to form the phosphor, provided the proportions of one component with respect to the other components are maintained in the same proportions as are given under molar ratios. The materials listed under Table I are indicated in the amounts of 3 and 9 moles, and the rest of the components as listed under Tables II, III and IV are indicated in molar proportions as required to combine with the indicated molar amounts of the raw-mix components under Table I. Each of the raw-mix components listed under Tables II, III and IV includes the preferred specific example, optimum molar ratios and minimum and maximum molar ratios which may be used with the indicated molar amounts of the Table I components.

Table I.—$Cd_3(PO_4)_2$ and excess $P_2O_5$ forming materials

| Compound (numerical designation and optimum specific example in moles) | | Minimum moles phosphate containing material | Maximum moles phosphate containing material |
|---|---|---|---|
| 1 | $3Cd_3(PO_4)_2+1.5(NH_4)_2HPO_4$ | $.06(NH_4)_2HPO_4$ | $3(NH_4)_2HPO_4$ |
| 2 | $9CdO+7.5(NH_4)_2HPO_4$ | 6.06 | 9 |
| 3 | $9CdCO_3+7.5(NH_4)_2HPO_4$ | 6.06 | 9 |
| 4 | $9Cd(NO_3)_2+7.5(NH_4)_2HPO_4$ | 6.06 | 9 |
| 5 | $9CdC_2O_4 \cdot 3H_2O+7.5(NH_4)_2HPO_4$ | 6.06 | 9 |
| 6 | $9Cd(C_2H_3O_2)_2 \cdot 3H_2O+7.5(NH_4)_2HPO_4$ | 6.06 | 9 |
| 7 | $9Cd(OH)_2+7.5(NH_4)_2HPO_4$ | 6.06 | 9 |
| 8 | $9CdO+3.75P_2O_5$ | 3.03 | 4.5 |
| 9 | $9CdO+7.5NH_4H_2PO_4$ | 6.06 | 9 |

NOTE.—Any of compounds designated 3–7 (inclusive) can be used with $P_2O_5$ as listed in number 8 or with $NH_4H_2PO_4$ as listed in number 9. Also, a part of the excess $P_2O_5$ may be supplied from the lead- and manganese containing materials noted in Tables III and IV.

Table II.—$CdF_2$ forming materials

| Compound (Numerical designation and moles of specific example) | | Minimum Moles | Optimum Mole Range | Maximum Moles |
|---|---|---|---|---|
| Example: | Moles of reactants | | | |
| 11 | $2.5CdF_2$ | 1.5 | 2.3–3.2 | 4.5 |
| 12 | $2.5(CdO+2NH_4F)$ | 1.5 | 2.3–3.2 | 4.5 |
| 13 | $2.5(CdCO_3+2NH_4F)$ | 1.5 | 2.3–3.2 | 4.5 |
| 14 | $2.5(CdNO_3 \cdot 4H_2O+2NH_4F)$ | 1.5 | 2.3–3.2 | 4.5 |
| 15 | $2.5(CdC_2O_4 \cdot 3H_2O+2NH_4F)$ | 1.5 | 2.3–3.2 | 4.5 |
| 16 | $2.5[Cd(C_2H_3O_2)_2 \cdot 3H_2O+2NH_4F]$ | 1.5 | 2.3–3.2 | 4.5 |
| 17 | $2.5[Cd(OH)_2+2NH_4F]$ | 1.5 | 2.3–3.2 | 4.5 |

NOTE.—The mole proportions of reactants designated 12–17 inclusive may be chosen to yield the desired minimum, maximum or optimum moles, whatever desired.

Table III.—$PbO$, $Pb_3(PO_4)_2$ forming material

| Compound (numerical designation and specific example) | | Minimum moles | Optimum Mole Range | Maximum Moles |
|---|---|---|---|---|
| 18 | $0.458PbO$ | 0.076 | 0.229–0.612 | 0.763 |
| 19 | $0.458PbCO_3$ | 0.076 | 0.229–0.612 | 0.763 |
| 20 | $0.458Pb(NO_3)_2$ | 0.076 | 0.229–0.612 | 0.763 |
| 21 | $0.153 \cdot 2PbCO_3 \cdot 1Pb(OH)_2$ | 0.025 | 0.076–0.204 | 0.255 |
| 22 | $0.458Pb(C_2H_3O_2)_2 \cdot 3H_2O$ | 0.076 | 0.229–0.612 | 0.763 |
| 23 | $0.458Pb(OH)_2$ | 0.076 | 0.229–0.612 | 0.763 |
| 24 | $0.153Pb_3O_4$ | 0.025 | 0.076–0.204 | 0.255 |
| 25 | $0.229Pb_2O_3$ | 0.038 | 0.119–0.306 | 0.382 |
| 26 | $0.458PbO_2$ | 0.076 | 0.229–0.612 | 0.763 |
| 27 | $0.153Pb_3(PO_4)_2$ | 0.025 | 0.076–0.204 | 0.255 |
| 28 | $S+(NH_4)_2HPO_4$ | | | |
| 29 | $S+NH_4H_2PO_4$ | | | |
| 30 | $S+P_2O_5$ | | | |

NOTE.—"S" represents any of the lead compounds of Examples 18–26 in the molar quantities as required to produce the minimum, optimum and maximum moles as indicated, stoichiometrically varying the amount of phosphate-containing material required to combine with the lead-containing reactant. Also, 0.458 mole is equivalent to 6% Pb by weight of cadmium phosphate in preferred specific example designated Example 1.

Table IV.—$MnO$, $Mn_3(PO_4)_2$ forming materials

| Compound (numerical designation and moles of specific example) | | Minimum moles | Preferred moles | Maximum moles |
|---|---|---|---|---|
| 31 | $0.2MnO$ | 0.01 | 0.1–0.3 | 0.4 |
| 32 | $0.067Mn_3(PO_4)_2$ | 0.0033 | 0.033–0.1 | 0.133 |
| 33 | $0.2MnCl_2 \cdot 4H_2O$ | 0.01 | 0.1–0.3 | 0.4 |
| 34 | $0.2MnCO_3$ | 0.01 | 0.1–0.3 | 0.4 |
| 35 | $0.2Mn(NO_2)_2$ | 0.01 | 0.1–0.3 | 0.4 |
| 36 | $0.2MnC_2O_4$ | 0.01 | 0.1–0.3 | 0.4 |
| 37 | $0.2Mn(C_2H_3O_2)_2 \cdot 4H_2O$ | 0.01 | 0.1–0.3 | 0.4 |
| 38 | $0.2Mn(OH)_2$ | 0.01 | 0.1–0.3 | 0.4 |
| 39 | $0.2MnO_2$ | 0.01 | 0.1–0.3 | 0.4 |
| 40 | $0.2MnF_2$ | 0.01 | 0.1–0.3 | 0.4 |
| 41 | $0.2MnC_2H_4O_6$ | 0.01 | 0.1–0.3 | 0.4 |

NOTE.—0.2 mole Mn is equivalent to 0.695% Mn by weight of cadmium phosphate in preferred specific example designated Example 1.

It will be recognized that the possible combinations of raw-mix components included under the foregoing Tables I–IV are numerous and each of these plurality of raw-mix combinations are satisfactory for forming the luminescent material of this invention. Also, the components as listed under the foregoing tables are by no means complete, but are only indicative of what constitute satisfactory raw-mix components.

It should be understood that the molar ratios as given in Tables I–IV will all produce an equivalent amount of the desired material, e. g., 0.229 mole of $Pb_2O_3$ (see numerical designation 25) will contain the same amount of lead as 0.458 mole of $Pb(OH)_2$ (see numerical designation 23).

It will be recognized that the objects of the invention have been achieved by providing a lead- and manganese-activated cadmium fluorophosphate luminescent material having an intense radiation which is peaked at about 5900 A. U. when irradiated by 2537 A. U. In addition there are provided limiting amounts for each of the essential elements of the phosphor.

While in accordance with the Patent Statutes one best known embodiment of the invention has been illustrated and described in detail, it is to be particularly understood that the invention is not limited thereto or thereby.

I claim:

1. A luminescent material having the general formulation $3Cd_3(PO_4)_2 \cdot xCdF_2 : yMn : zPb$, where $x$ is not less than 1.5 moles and not more than 4.5 moles, $y$ is not less than 0.0347 percent by weight and not more than 1.390 percent by weight of cadmium orthophosphate, $z$ is not less than 1% by weight and not more than 10% by weight of cadium orthophosphate, and there is chemically combined with said luminescent material from 1 to 50 molar percent of excess $P_2O_5$ over the total moles of cadmium orthophosphate.

2. The method of preparing a lead- and manganese-activated cadmium fluorophosphate luminescent material having as essential elements Cd, F, P, O, Mn and Pb, comprising mixing the following raw mix components: cadmium- and phosphorus- and oxygen-containing material which on firing will form $Cd_3(PO_4)_2$ with an excess of $P_2O_5$ and which material is free from non-volatile constituents other than said essential elements; cadmium- and fluorine-containing materials which will form $CdF_2$ and which material is free from non-volatile constituents other than said essential elements; manganese-containing material which will form one of the group consisting of MnO and $Mn_3(PO_4)_2$ and which manganese-containing material is free from non-volatile constituents other than said essential elements; and lead-containing material which will form one of the group consisting of PbO and $Pb_3(PO_4)_2$ and which lead-containing material is free from non-volatile constituents other than said essential elements, said essential element containing materials being present in the following stated proportion: said $Cd_3(PO_4)_2$ and excess $P_2O_5$ forming material being present in amounts sufficient to form 3 moles of $Cd_3(PO_4)_2$ and an excess of from 1 to 50 molar percent of $P_2O_5$; said $CdF_2$ forming material being present in amounts sufficient to form from 1.5 to 4.5 moles $CdF_2$; said manganese-containing material being present in amounts sufficient to produce from 0.01 mole to 0.4 mole MnO; and said lead-containing material being present in amounts sufficient to produce from 0.076 mole to 0.763 mole PbO; the total excess of said $P_2O_5$ not exceeding 50 molar percent of the cadmium orthophosphate; milling the foregoing raw-mix components, and firing said milled raw-mix components at from 600° C. to 900° C. for at least one hour.

3. A luminescent material having the general formulation $3CD_3(PO_4)_2 \cdot xCdF_2:yMn:zPb$, where $x$ is from 2.3 to 3.2 moles, $y$ is from 0.347% to 1.041% by weight of cadmium orthophosphate, $z$ is from 3% to 8% by weight of cadmium orthophosphate, and there is chemically combined with said luminescent material from 1 to 50 molar percent of excess $P_2O_5$ over the total moles of cadmium orthophosphate.

4. The method of preparing a luminescent material comprising the following raw-mix components in the stated proportions: cadmium oxide, 12 moles; diammonium acid phosphate, 7.5 moles; ammonium fluoride, 6 moles; plumbous carbonate 0.458 moles; and manganous oxide, 0.20 moles; milling the foregoing raw-mix components; and firing said milled raw-mix components at from 600° C. to 900° C. for at least one hour.

References Cited in the file of this patent
UNITED STATES PATENTS

| | | |
|---|---|---|
| 2,476,676 | McKeag | July 19, 1949 |
| 2,672,451 | Wollentin | Mar. 16, 1954 |

OTHER REFERENCES

Chem. Abstracts, vol. 49, No. 1, Jan. 10, 1955, page 63.